(12) United States Patent
Zhou et al.

(10) Patent No.: US 11,677,457 B2
(45) Date of Patent: Jun. 13, 2023

(54) ENHANCEMENT OF BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/246,168

(22) Filed: Apr. 30, 2021

(65) Prior Publication Data
US 2022/0352966 A1    Nov. 3, 2022

(51) Int. Cl.
| | |
|---|---|
| *H04W 76/19* | (2018.01) |
| *H04B 7/08* | (2006.01) |
| *H04W 72/044* | (2023.01) |
| *H04W 80/02* | (2009.01) |
| *H04W 24/10* | (2009.01) |
| *H04W 72/23* | (2023.01) |

(52) U.S. Cl.
CPC ............ *H04B 7/088* (2013.01); *H04W 24/10* (2013.01); *H04W 72/046* (2013.01); *H04W 72/23* (2023.01); *H04W 76/19* (2018.02); *H04W 80/02* (2013.01)

(58) Field of Classification Search
CPC ...... H04B 7/088; H04W 76/19; H04W 24/10; H04W 72/042; H04W 72/046; H04W 80/02; H04W 36/0033; H04W 8/005; H04W 16/28
See application file for complete search history.

(56) References Cited

U.S. PATENT DOCUMENTS

| | | | | |
|---|---|---|---|---|
| 2018/0288756 | A1* | 10/2018 | Xia ..................... | H04W 16/28 |
| 2019/0082334 | A1* | 3/2019 | Nagaraja .............. | H04W 24/04 |
| 2019/0319833 | A1* | 10/2019 | Nagaraja ............. | H04W 72/085 |
| 2022/0007448 | A1* | 1/2022 | Ryu ..................... | H04W 76/19 |
| 2022/0302983 | A1* | 9/2022 | Zhou .................... | H04W 24/10 |

FOREIGN PATENT DOCUMENTS

WO    WO-2019215389 A2 *  11/2019  ........... H04B 7/0695

* cited by examiner

*Primary Examiner* — Mewale A Ambaye
(74) *Attorney, Agent, or Firm* — Arent Fox, LLP

(57) ABSTRACT

A user equipment may be configured to perform beam failure detection enhancement. In some aspects, the user equipment may receive a beam failure detection reference signal (BFD-RS) from a base station, detect an occurrence of an interference event based on a first measurement of the BFD-RS or a channel event based on a second measurement of the BFD-RS, and update count information based on a detection function and the occurrence. Further, the user equipment may determine that at least one of a first timer for interference events or a second timer for channel events is active, and determine whether to perform a beam failure recovery process based on comparing a total count of the count information to a predefined threshold value.

30 Claims, 11 Drawing Sheets

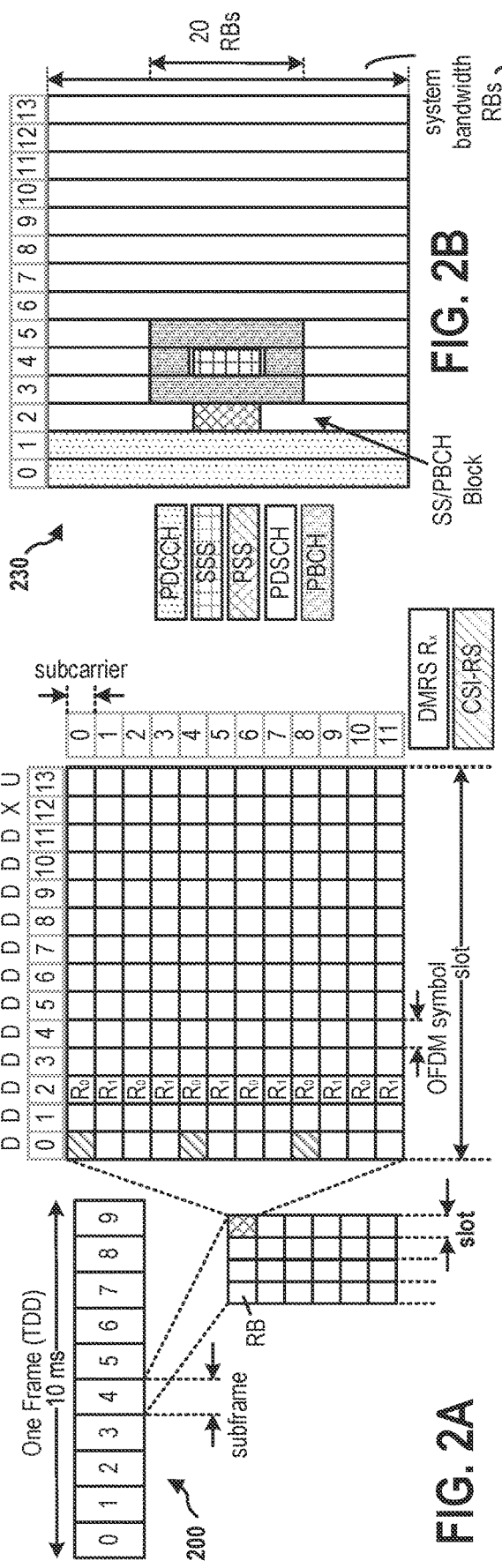
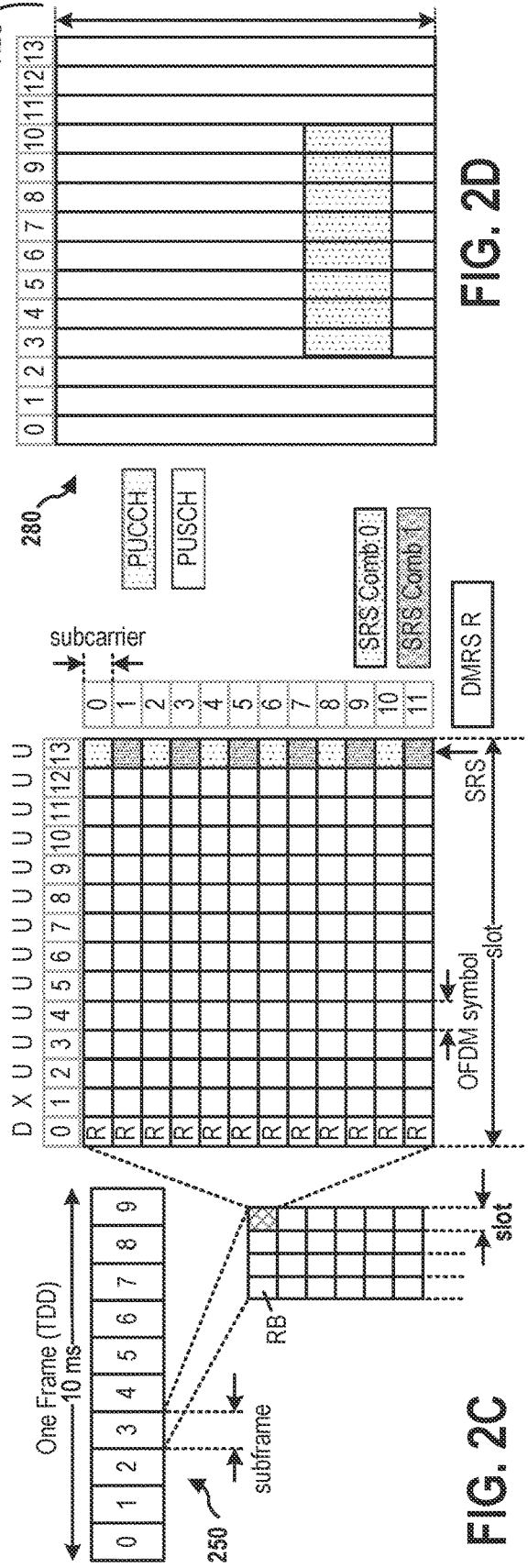
FIG. 2A
FIG. 2B
FIG. 2C
FIG. 2D

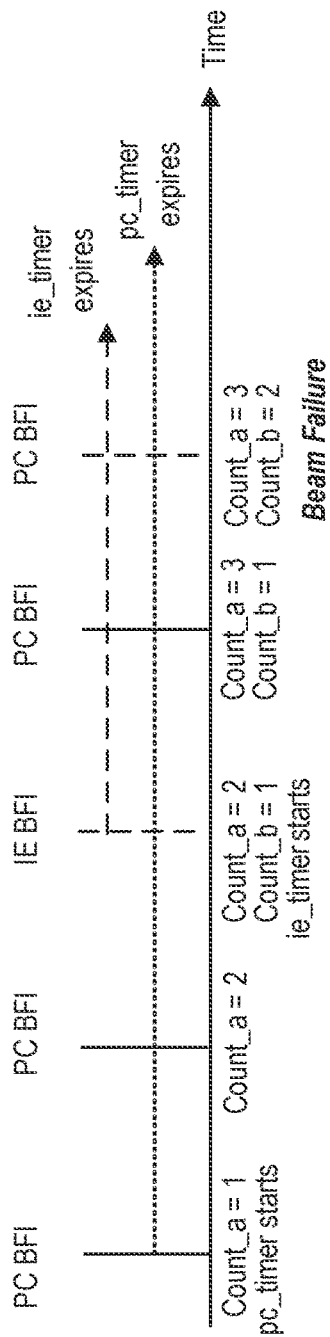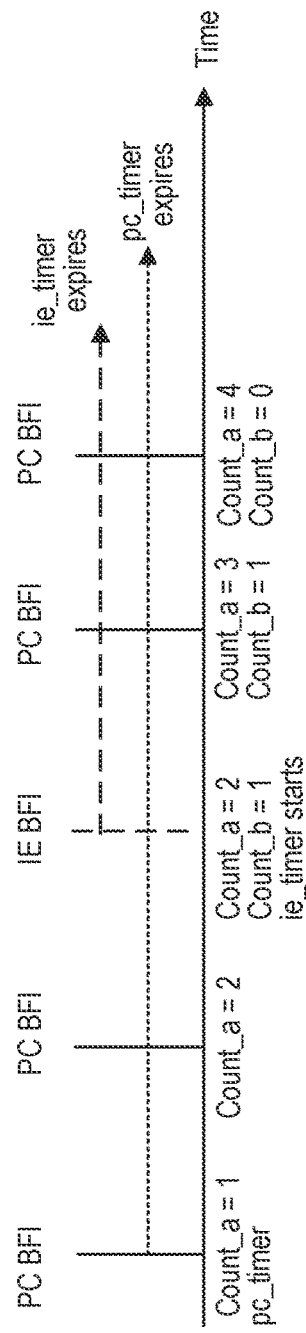
FIG. 6B
FIG. 6C

1000

Transmitting, to a user equipment (UE), detection configuration information indicating at least a detection function to be applied during a beam failure detection process that distinguishes between an occurrence of an interference event based on a first measurement of a beam failure detection reference signal (BFD-RS) by the UE or a channel event based on a second measurement of the BFD-RS by the UE
1010

Transmitting, to the UE, second detection configuration information indicating one or more configuration parameters of the beam failure detection process
1020

Transmitting to the UE, a beam failure detection reference signal (BFD-RS) to be measured during the beam failure detection process performed at the UE
1030

Receiving a beam failure recovery request based on the BFD-RS and the UE performing the beam failure detection process in accordance with the detection configuration information
1040

FIG. 10

ENHANCEMENT OF BEAM FAILURE DETECTION

BACKGROUND

Technical Field

The present disclosure relates generally to wireless communication, and more particularly, to implementing beam failure detection enhancement based on different BFI types.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE) comprising receiving a beam failure detection reference signal (BFD-RS) from a base station; detecting an occurrence of an interference event based on a first measurement of the BFD-RS or a channel event based on a second measurement of the BFD-RS; updating count information based on a detection function and the occurrence; determining that at least one of a first timer for interference events or a second timer for channel events is active; and determining whether to perform a beam failure recovery process based on comparing a total count of the count information to a predefined threshold value.

The disclosure also provides an apparatus (e.g., a UE) including a memory storing computer-executable instructions and at least one processor configured to execute the computer-executable instructions to receive a beam failure detection reference signal (BFD-RS) from a base station; detect an occurrence of an interference event based on a first measurement of the BFD-RS or a channel event based on a second measurement of the BFD-RS; update count information based on a detection function and the occurrence; determine that at least one of a first timer for interference events or a second timer for channel events is active; and determine whether to perform a beam failure recovery process based on comparing a total count of the count information to a predefined threshold value. In addition, the disclosure also provides an apparatus including means for performing the above method, and a non-transitory computer-readable medium storing computer-executable instructions for performing the above method.

An example implementation includes a method of wireless communication at a base station comprising transmitting, to a UE, beam failure configuration information indicating at least a detection function to be applied during a beam failure detection process that distinguishes between an occurrence of an interference event based on a first measurement of a BFD-RS by the UE or a channel event based on a second measurement of the BFD-RS by the UE; and transmitting, to the UE, the BFD-RS to be measured during the beam failure detection process performed at the UE.

The disclosure also provides an apparatus (e.g., a base station) including a memory storing computer-executable instructions and at least one processor configured to execute the computer-executable instructions to transmit, to UE, beam failure configuration information indicating at least a detection function to be applied during a beam failure detection process that distinguishes between an occurrence of an interference event based on a first measurement of a BFD-RS by the UE or a channel event based on a second measurement of the BFD-RS by the UE; and transmit, to the UE, the BFD-RS to be measured during the beam failure detection process performed at the UE. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

FIG. 6B is a third timing diagram illustrating an example of beam failure detection enhancement, in accordance with some aspects of the present disclosure.

FIG. 6C is a fifth timing diagram illustrating an example of beam failure detection enhancement, in accordance with some aspects of the present disclosure.

FIG. 10 is a flowchart of an example method of implementing beam failure detection enhancement at a base station, in accordance with some aspects of the present disclosure.

DETAILED DESCRIPTION

Figure 1:
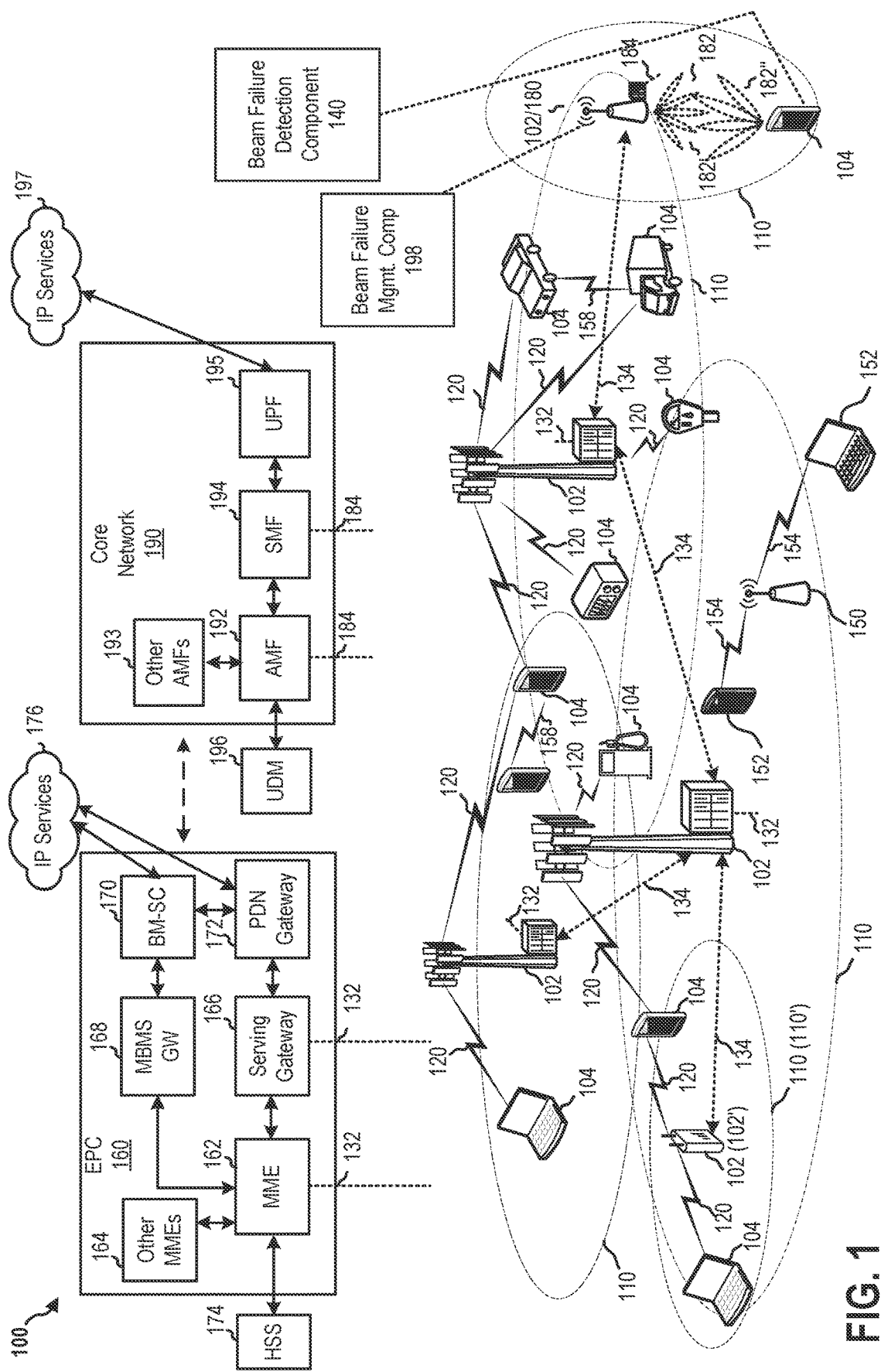
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing beam failure detection enhancement. In some aspects, a UE may employ a beam failure detection process that distinguishes between different types of beam failure indicators (BFIs), e.g., interference-based BFIs and poor channel-based BFIs. In particular, the UE may monitor for beam failure by employing a process that measures BFD-RS signals periodically received from a base station, generates BFI indicators based on the measurements, and maintains BFI count information based upon the type of BFI indicators generated by the UE. As described in detail herein, the UE may apply various parameters to the beam failure detection process to reduce the effects of temporary interference. Further, the UE may compare the BFI count information to a predefined threshold to determine whether to trigger a beam failure recovery process between the base station and the UE. Accordingly, the present techniques distinguish between different types of BFIs when determining whether to perform beam failure recovery, thereby reducing needless performance of beam failure recovery and preserving time and power resources.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a base station 102 may include a beam failure management component 198 configured to manage beam failure detection at one or more UEs 104. In addition, the beam failure management component 198 may transmit beam failure detection reference signals (BFD-RS) to the UEs 104, and configure a beam failure detection process at the UEs 104. In particular, the beam failure management component 198 may configure the beam failure detection process, a detection function employed by the beam failure detection process, and/or one or more parameters of the detection function. Further, a UE 104 may include a beam failure detection component 140 configured to detect beam failure at the UE 104. In particular, the beam failure detection component 140 may employ a beam failure detect process to identify a beam failure context by applying a detection function that distinguishes between interference-based beam failure indicators and poor channel-based beam failure indicators. Further, in some aspects, the beam failure detection component 140 may perform the beam failure detection process based on configuration parameters received from a base station 102.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
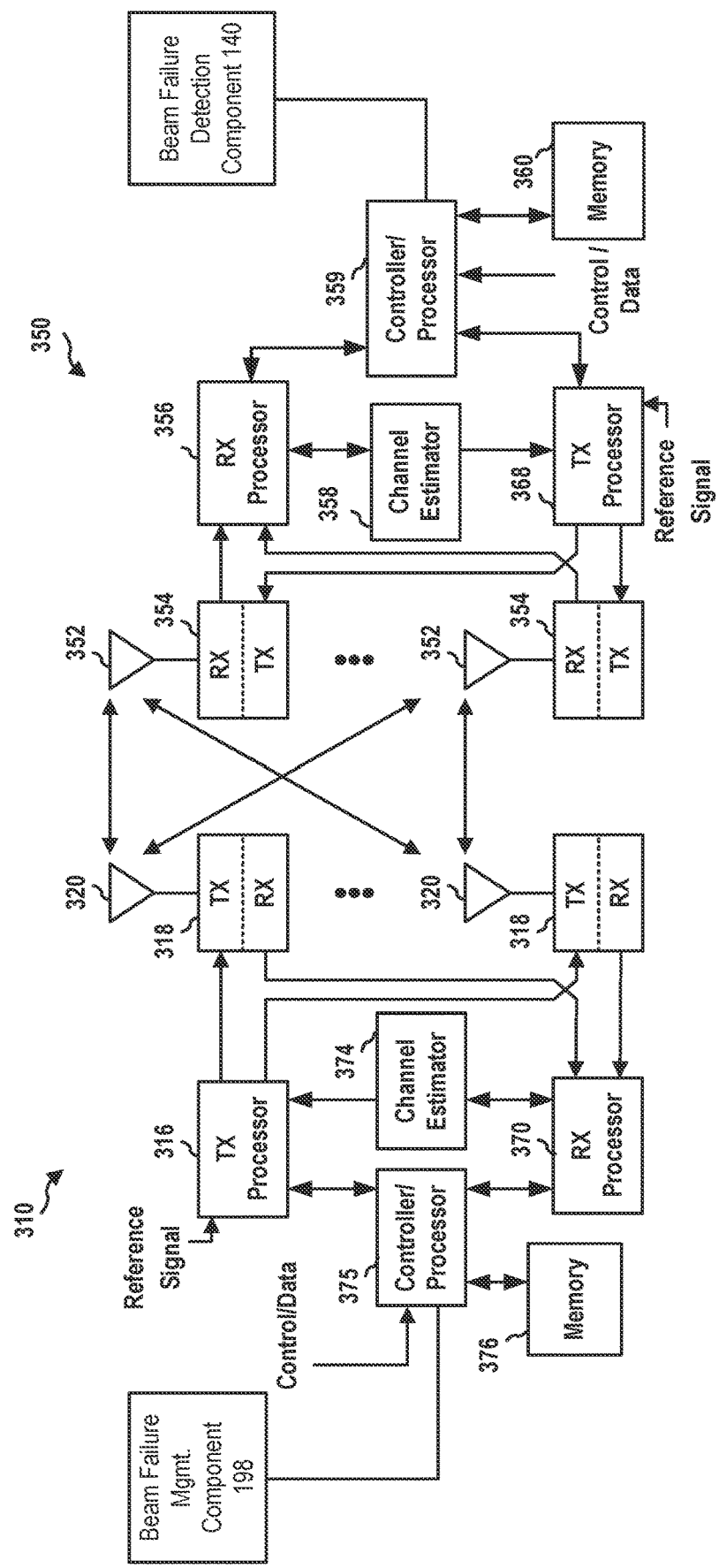
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the beam failure detection component 140 of FIG. 1.

In the base station 102/180, at least one of the TX processor 316, the RX processor 370, and the controller/processor 375 may be configured to perform aspects in connection with beam failure management component 198 of FIG. 1.

In highly directional system such as 5G NR, beams are used between a transmitter (e.g., a base station) and a receiver (e.g., a UE) to facilitate satisfactory data transmission performance. However, due to the uncertain nature of wireless environments and unexpected blocking, beams are vulnerable to beam failure, especially at higher frequency such as FR2 and FR2x. Typically, a UE may generate a beam failure indicator (BFI) in response to poor channel quality or temporary interference caused by other beams and/or UEs. Further, a UE may perform a beam failure recovery process in response to generating a predefined amount of BFIs within a predefined amount of time. In most cases, poor channel quality events demand generation of a BFI within a beam failure management system, while some interference events may quickly subside and may not require generation of a BFI. However, current beam failure detection processes fail to distinguish between different causes of BFI, and thus may overreact to certain types of BFIs. As a result, UEs may unnecessarily perform a resource and time intensive beam failure recovery process in response to temporary interference that doesn't warrant performance of the beam failure recovery process.

The present disclosure provides techniques for implementing beam failure detection enhancement. As described above, current beam failure detection processes fail to distinguish between different types of BFIs. For example, a UE may process a poor channel quality BFI identically to a temporary interference BFI. Accordingly, the present techniques distinguish between different types of BFIs when determining whether to perform beam failure recovery, thereby reducing needless performance of beam failure recovery and preserving time and power resources.

Referring to FIGS. 4-8, in one non-limiting aspect, a system 400 is configured to facilitate common beam indication and activation for individual TCI state lists.

Figure 4:
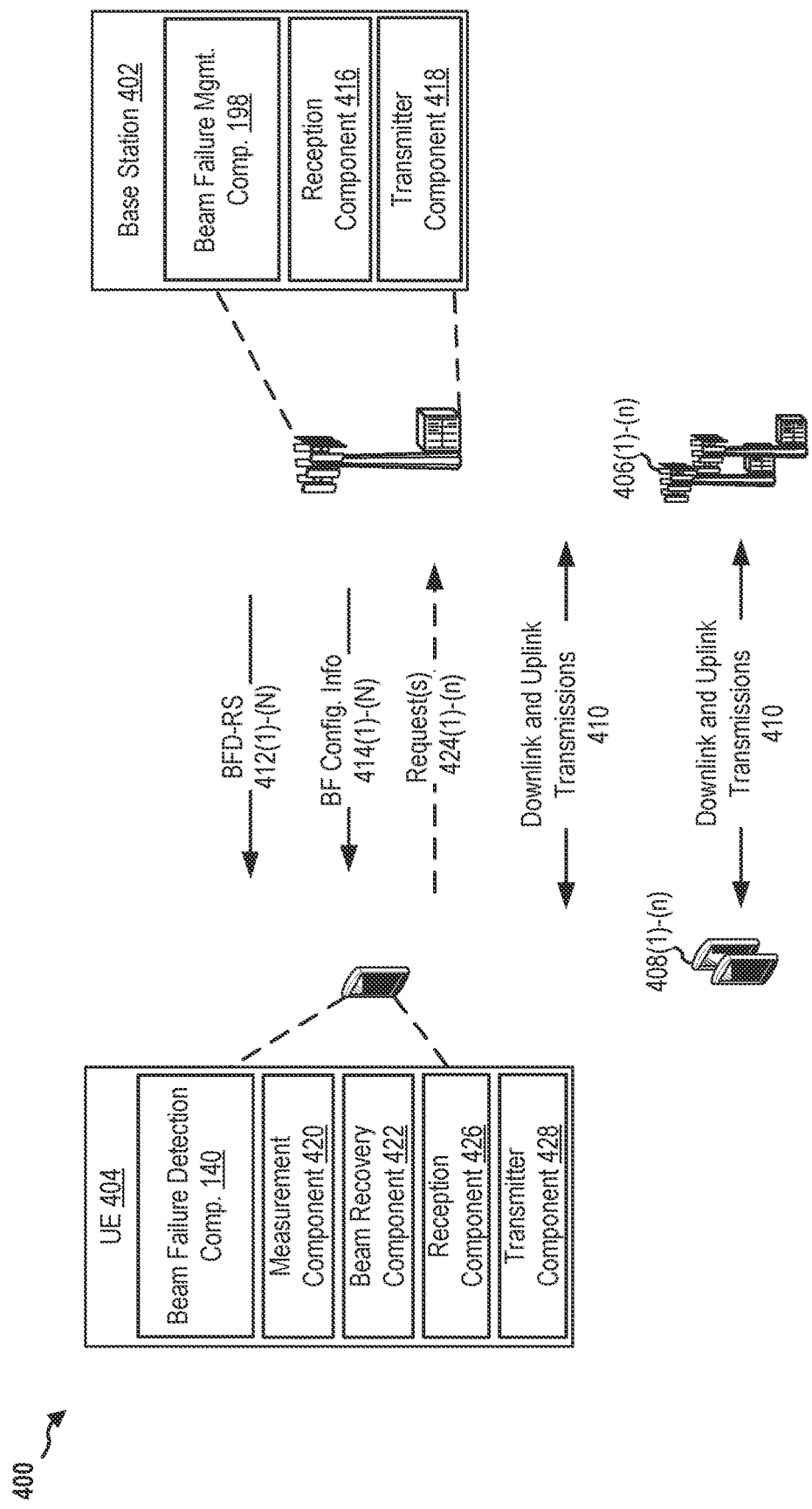
FIG. 4 is a diagram illustrating example communications and components of a base station and UEs, in accordance with some aspects of the present disclosure.

FIG. 4 is a diagram illustrating example communications and components of base stations and UEs. As illustrated in FIG. 4, the system 400 may include a base station 402 (e.g., the base station 102/180) serving at least a UE 404 (e.g., the UE 104). Further, the systems 400 may include a plurality of other base stations 406 and a plurality of other UEs 408 configured to perform similar operations as the base station 402 and the UE 404, respectively. Further, the base station 402 and the UE 404 may be configured for beamformed wireless communications. For example, the base station 402 may exchange downlink and uplink transmissions 410 with the UE 404. Additionally, the plurality of other base stations 106 and the plurality of other UEs 408 may communicate with the base station 402, the UE 404, and/or within close proximity of the base station 402 and/or the UE 404.

As illustrated in FIG. 4, the base station 402 may include the beam failure management component 198 configured to configure a beam failure detection process at the UEs 104 and periodically transmit BFD-RS 412(1)-(N) to one or more UEs (e.g., the UE 404). In some aspects, the base station 402 may configure and/or re-configure the UE 404 by transmitting beam failure configuration information 414 to the UE 404. Upon receipt of the of the beam failure configuration information 414, the UE 404 may employ a beam failure detection process in accordance with the beam failure configuration information 414. The beam failure configuration information 414 may include one or more configuration parameters for configuring the beam failure detection process performed by the UE 404. Some examples of configuration parameters include one or more detection functions that may be employed by the beam failure detection process performed by the UE 404, and/or one or more configuration parameters of the detection function or the beam failure detection process. For instance, the beam failure configuration information 414 may include expiration values for timers employed by the UE 404 for the different types of BFIs, a predefined threshold value used to determine the occurrence of beam failure, a function for determining an amount of BFIs that have been generated while the timers are active, and a function for determining a weight to apply to a count of BFIs of a particular type. Further, the beam failure configuration information 414 may include a plurality of values for each parameter and/or selection information that selects a value from the plurality of values.

As described herein, a "detection function" may refer to a function for determining a count of BFIs or a function for determining a weight to apply to a type of BFIs within the function for determining the count of BFIs. Further, in some aspects, the base station 402 may transmit the beam failure configuration information 414 as RRC, DCI, or MAC-CE.

For instance, a RRC message including the beam failure configuration information 414 may configure the UE 404 to employ a plurality of detection functions in the beam failure detection process. Further, a DCI or MAC-CE message including the beam failure configuration information 414 may indicate which of the plurality of detection functions to apply for a period of time.

The base station 402 may include a reception component 416 and a transmission component 418. The reception component 416 may include, for example, a radio frequency (RF) receiver for receiving the signals described herein. The transmission component 418 may include, for example, an RF transmitter for transmitting the signals described herein. In an aspect, the reception component 416 and the transmission component 418 may be co-located in a transceiver (e.g., the transceiver 810 shown in FIG. 8).

As illustrated in FIG. 4, the UE 404 may include the beam failure detection component 140, a measurement component 420, and a beam failure recovery component 422. The measurement component may be configured to measure the plurality of BFD-RS 412(1)-(N) received from the base station 402.

The beam failure detection component 140 may be configured to receive the beam failure configuration information 414 from the base station 402, configure the beam failure detection process that distinguishes between different types of BFIs in accordance with the beam failure configuration information 414, monitor for beam failure via the beam failure detection process in view of the beam failure measurements of the BFD-RSs 412(1)-(n), and trigger a beam failure recovery process performed by the beam failure recovery component 422 in response to detecting beam failure.

The measurement component 420 may determine one or more measurement values by measuring a BFD-RS 412. Some examples of the measurement values include a block error rate (BLER), signal-to-interference-plus-noise ratio (SINR), signal-to-noise ratio (SNR), and/or interference estimate, e.g., an estimate of interference caused by the downlink and uplink transmissions 410 between the plurality of other base stations 406 and the plurality of other UEs 408. Further, the measurement component 420 may provide the measurement values to the beam failure detection component 140. In response to receipt of the measurement values, the beam failure detection component 140 may determine whether to generate a BFI based on the measurement values and the type of BFI to generate based on the measurement values. Further, the beam failure detection component 140 may monitor for beam failure based on the generated BFIs. In some aspects, BFI generation may be performed at the physical layer and beam failure monitoring may be performed at the MAC layer. In some other aspects, BFI generation and beam failure monitoring may both be performed at the MAC layer.

Further, in some examples, the beam failure detection component 140 may maintain two separate counters for two different types of BFIs, and determine that a beam failure has occurred when a total count based on the counters exceeds or equals a predefined value while at least one of a first timer associated with BFIs generated in response poor channel quality events and/or a second timer associated with BFIs generated in response to interference events is active. For example, in response to the beam failure detection component 140 determining the occurrence of a BFI, the beam failure detection component 140 may determine whether the timer corresponding to the type of BFI is active. If the timer has expired, the beam failure detection component 140 may start the timer in response to the BFI. In addition, the beam failure detection component 140 may increment a counter corresponding to the type of BFI, e.g., pc_counter for BFIs generated in response to poor channel quality events and ie_counter for BFIs generated in response to interference events, and determine whether a total count based on combining the counters (e.g., pc_counter, and ie_counter) equals or exceeds a predefined threshold.

As described in detail herein, the beam failure detection component 140 may employ a detection function to determine the total count of BFIs. Further, the detection function may apply different weights to values of the different counters. For example, the total count of BFIs may be derived from the pc_counter, the ie_counter, a weight, and a maximum interference count (i.e., maxCount_interf) by the following formula:

$$\text{total\_count} = pc\_counter + w \cdot ie\_counter \quad \text{(Eq. 1)}$$

Where w is a weight and may be equal to one of the following formulas:

$$w = 1/\text{maxCount\_interf} \quad \text{(Eq. 2)}$$

$$w = 1 - 1/\text{maxCount\_interf} \quad \text{(Eq. 3)}$$

As described above, the beam failure detection component 140 may operate timers corresponding to the different types of BFIs. For example, the beam failure detection component 140 may operate the first timer (i.e., pc_timer) associated with BFIs generated in response poor channel quality events and/or the second timer (i.e., ie_timer) associated with BFIs generated in response to interference events. Further, each timer may have a predefined expiration value configurable by the base station 402 via the beam failure configuration information 414. In some aspects, the pc_timer may be longer than the ie_timer. Additionally, the beam failure detection component 140 may reset a counter when the corresponding timer expires. For example, the beam failure detection component 140 may generate a BFI in response to poor channel quality, determine that the pc_timer is inactive and initialize the pc_timer, increment the pc_counter, and determine whether the total count equals or exceeds the predefined value. Further, the beam failure detection component 140 may determine that the pc_timer has expired and reset the pc_counter.

Further, in some other examples, the beam failure detection component 140 may maintain a single counter (i.e., total count) across the different types of BFIs, and determine that a beam failure has occurred when total count equals or exceeds a predefined value while at least one of the pc_timer and/or ie_timer is active. For example, in response to the beam failure detection component 140 determining the occurrence of a BFI, the beam failure detection component 140 may determine whether the timer corresponding to the type of BFI is active. If the time has expired, the beam failure detection component 140 may initialize the timer. In addition, the beam failure detection component 140 may increment the total count, and determine whether total count equals or exceeds a predefined threshold.

As described in detail herein, the beam failure detection component 140 may employ a detection function to determine the total count of BFIs. Further, the detection function may apply different weights to values of the different types of BFIs when tallying the total count. For example, the total count of BFIs may be derived by the following formulas:

$$F = \text{event\_PC} + \text{event\_IE} \cdot w \quad \text{(Eq. 4)}$$

$$\text{total\_count}_{updated} = \text{total\_count}_{old} + F \quad \text{(Eq. 5)}$$

Where event_PC and event_IE are binary functions and w is a weight that may be less than one.

In addition, the beam failure detection component 140 may operate timers corresponding to the different types of BFIs. For example, the beam failure detection component 140 may operate the first timer (i.e., pc_timer) associated with BFIs generated in response to poor channel quality events and/or the second timer (i.e., ie_timer) associated with BFIs generated in response to interference events. Further, each timer may have a predefined expiration value configurable by the base station 402 via the beam failure configuration information 414. In some aspects, the pc_timer may be longer than the ie_timer. Further, the beam failure detection component 140 may modify the total count when the timers expire. In some aspects, the beam failure detection component 140 may zero the total count when the pc_timer expires and round the total count when the ie_timer expires (e.g., round down, round up, round to the closest integer). For example, the beam failure detection component 140 may generate a BFI in response to poor channel quality, determine that the pc_timer is inactive and initialize the pc_timer, increment the total count, and determine whether the total count equals or exceeds the predefined value. Further, the beam failure detection component 140 may generate a BFI in response to interference, determine that the ie_timer is inactive and initialize the ie_timer, increment the total count by a fractional value due to the weight, and determine whether the total count equals or exceeds the predefined value. In addition, the beam failure detection component 140 may determine that the ie_timer has expired and round down the total count by decrementing the total count. In addition, at a later point in time, the beam failure detection component 140 may determine that the pc_timer has expired and reset the total count.

In addition, when the beam failure detection component 140 determines that the total count equals or exceeds the predefined value, the beam failure detection component 140 triggers a beam failure recovery process performed by the beam failure recovery component 422. In some aspects, the beam failure recovery process may include transmitting a request 424 to the base station 402 for beam failure recovery via a RACH procedure or a PUCCH. For example, the beam failure recovery component 422 may request beam failure recovery by indicating a new SS block or CSI-RS via a RACH procedure.

In addition, the UE 404 may include a reception component 426 and a transmission component 428. The transmission component 428 may be configured to generate signals for transmission operations and sensing as described herein. The transmission component 428 may include, for example, a RF transmitter for transmitting the signals described herein. The reception component 426 may include, for example, a RF receiver for receiving the signals described herein. In an aspect, the reception component 426 and the transmission component 428 may be co-located in a transceiver (e.g., the transceiver 910 shown in FIG. 9).

Figure 5:
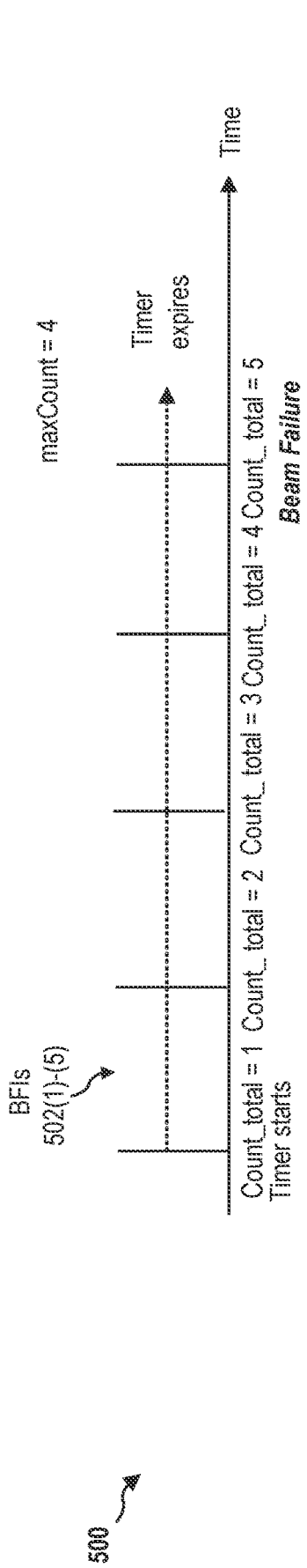
FIG. 5 is a first timing diagram illustrating an example of beam failure detection, in accordance with some aspects of the present disclosure.

FIG. 5 is a first timing diagram illustrating an example 500 of beam failure detection, in accordance with some aspects of the present disclosure. As illustrated in FIG. 5, a UE may fail to distinguish between BFIs of different types. In particular, each BFI 502(1)-(5) may increment the total count equally even when the BFIs are of different types. Further, if the maximum count employed by the UE to determine beam failure is five, beam failure would be declared after the generation of BFI 502(5) even if at least one of the BFI indicators 502(1)-(5) are in response to temporary interference not indicative of beam failure.

Although FIGS. 5, 6A-6C, and 7 illustrate a specific number of BFIs, a UE may generate any number of BFIs.

Figure 6A:
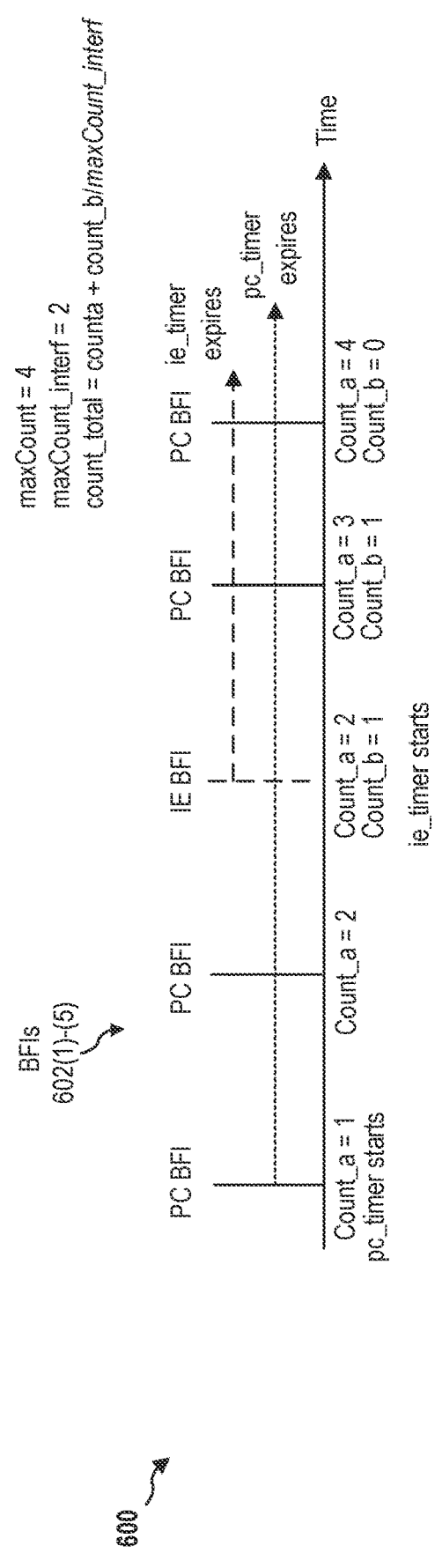
FIG. 6A is a second timing diagram illustrating an example of beam failure detection enhancement, in accordance with some aspects of the present disclosure.

FIG. 6A is a second timing diagram illustrating an example 600 of beam failure detection enhancement, in accordance with some aspects of the present disclosure. As illustrated in FIG. 6A, as described in detail herein, a UE 404 may employ a beam failure detection process that distinguishes between different types of BFIs when detecting beam failure. Further, as an example, the beam failure detection process may be configured with a maximum count of five and a maximum interference count of two, and employ the functions of Eqs. 1 and 2.

As illustrated in FIG. 6A, the UE 404 may generate a first BFI 602(1) of a first type (e.g., a poor channel BFI). In response, the UE 404 may start the timer of the first type and increment the counter of the first type by one. Further, the UE 404 may generate a second BFI 602(2) of the first type and increment the counter of the first type. Additionally, the UE 404 may generate third BFI 602(3) of the second type. In response, the UE 404 may start the timer of the second type and increment the count of the second type by one. The UE 404 may not declare beam failure as the total count as determined by Eq. 1, based on the separate counters, is not greater than the max count. As illustrated in FIG. 6A, the UE 404 may further generate fourth and fifth BFIs 602(4)-(5) of the first type and increment the counter of the first type accordingly. However, even though the amount of BFIs generated before the timers expire is greater than the maximum count, beam failure will not be declared by the UE as Eq. 1 applies a weight to the value of the counter for the second type of BFIs, which reduces the influence of the second type of BFI.

FIG. 6B is a third timing diagram illustrating an example 604 of beam failure detection enhancement, in accordance with some aspects of the present disclosure. As illustrated in FIG. 6B, as described in detail herein, a UE 404 may employ a beam failure detection process that distinguishes between different types of BFIs when detecting beam failure. Further, as an example, the beam failure detection process may be configured with a maximum count of four and a maximum interference count of two, and employ the functions of Eqs. 1 and 2.

As illustrated in FIG. 6B, the UE 404 may generate a first BFI 606(1) of a first type (e.g., a poor channel BFI). In response, the UE 404 may start the timer of the first type and increment the counter of the first type by one. Further, the UE 404 may generate a second BFI 606(2) of the first type and increment the counter of the first type. Additionally, the UE 404 may generate third BFI 606(3) of the second type. In response, the UE 404 may start the timer of the second type and increment the count of the second type by one. The UE 404 may not declare beam failure as total count as determined by eq. 1, based on the separate counters, is not greater than the max count. As illustrated in FIG. 6B, the UE 404 may further generate fourth and fifth BFIs 606(4)-(5) of the first type and second type, respectively, and increment the counters of the first type and second type accordingly. Further, after the generation of the fifth BFI 606(5), the UE 404 may declare beam failure as the total count will equal the predefined maximum count.

FIG. 6C is a fifth timing diagram illustrating an example 608 of beam failure detection enhancement, in accordance with some aspects of the present disclosure. As illustrated in FIG. 6C, as described in detail herein, a UE 404 may employ a beam failure detection process that distinguishes between different types of BFIs when detecting beam failure. Further, as an example, the beam failure detection process may be configured with a maximum count of five, a maximum interference count of two and employ the functions of Eqs. 1 and 3.

As illustrated in FIG. 6C, the UE 404 may generate a first BFI 610(1) of a first type (e.g., a poor channel BFI). In response, the UE 404 may start the timer of the first type and increment the counter of the first type by one. Further, the UE 404 may generate a second BFI 610(2) of the first type and increment the counter of the first type. Additionally, the UE 404 may generate third BFI 610(3) of the second type. In response, the UE 404 may start the timer of the second type and increment the count of the second type by one. The UE 404 may not declare beam failure as total count as determined by eq. 1, based on the separate counters, is not greater than the max count. As illustrated in FIG. 6C, the UE 404 may further generate fourth and fifth BFIs 610(4)-(5) of the first type and increment the counter of the first type accordingly. However, even though the amount of BFIs generated before the timers expire is greater than the maximum count, beam failure will not be declared by the UE 404 as eq. 1 applies a weight to the value of the counter for the second type of BFIs, which reduces the influence of the second type of BFI.

Figure 7:
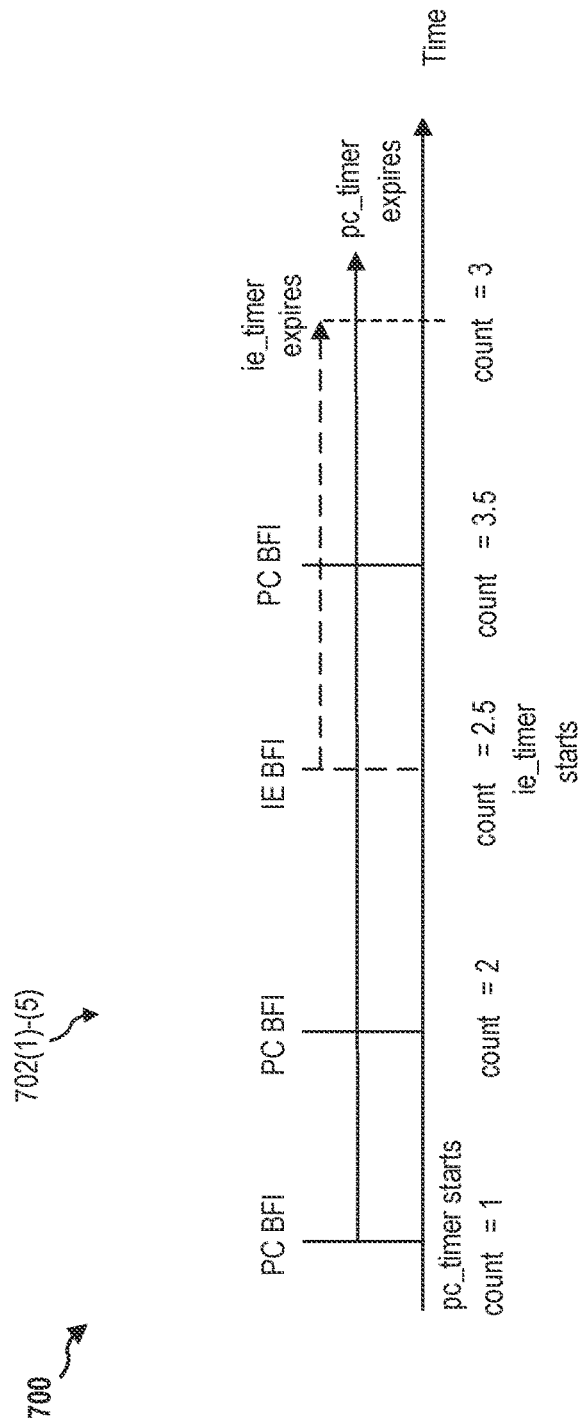
FIG. 7 is a sixth timing diagram illustrating an example of beam failure detection enhancement, in accordance with some aspects of the present disclosure.

FIG. 7 is a sixth timing diagram illustrating an example 612 of beam failure detection enhancement, in accordance with some aspects of the present disclosure. As illustrated in FIG. 7, as described in detail herein, a UE 404 may employ a beam failure detection process that distinguishes between different types of BFIs when detecting beam failure. Further, as an example, the beam failure detection process may be configured to round down, employ a maximum count of four, a weight of 0.5, and the functions of Eqs. 4 and 5.

As illustrated in FIG. 7, the UE 404 may generate a first BFI 614(1) of a first type (e.g., a poor channel BFI). In response, the UE 404 may start the timer of the first type and increment the total count by one. Further, the UE 404 may subsequently generate a second BFI 614(2) of the first type and increment the counter of the first type. Additionally, the UE 404 may generate third BFI 614(3) of the second type. In response, the UE 404 may start the timer of the second type and increment the total count of the second type by 0.5. As illustrated in FIG. 7, the UE 404 may further generate a fourth BFIs 614(4) of the first type and increment the counter of the first type accordingly. In addition, when the counter of the second type expires, the total count may be rounded down from three and a half to three. Further, because the total count does not equal or exceed the maximum value before the first time expires, the UE 404 will not declare beam failure.

Figure 8:
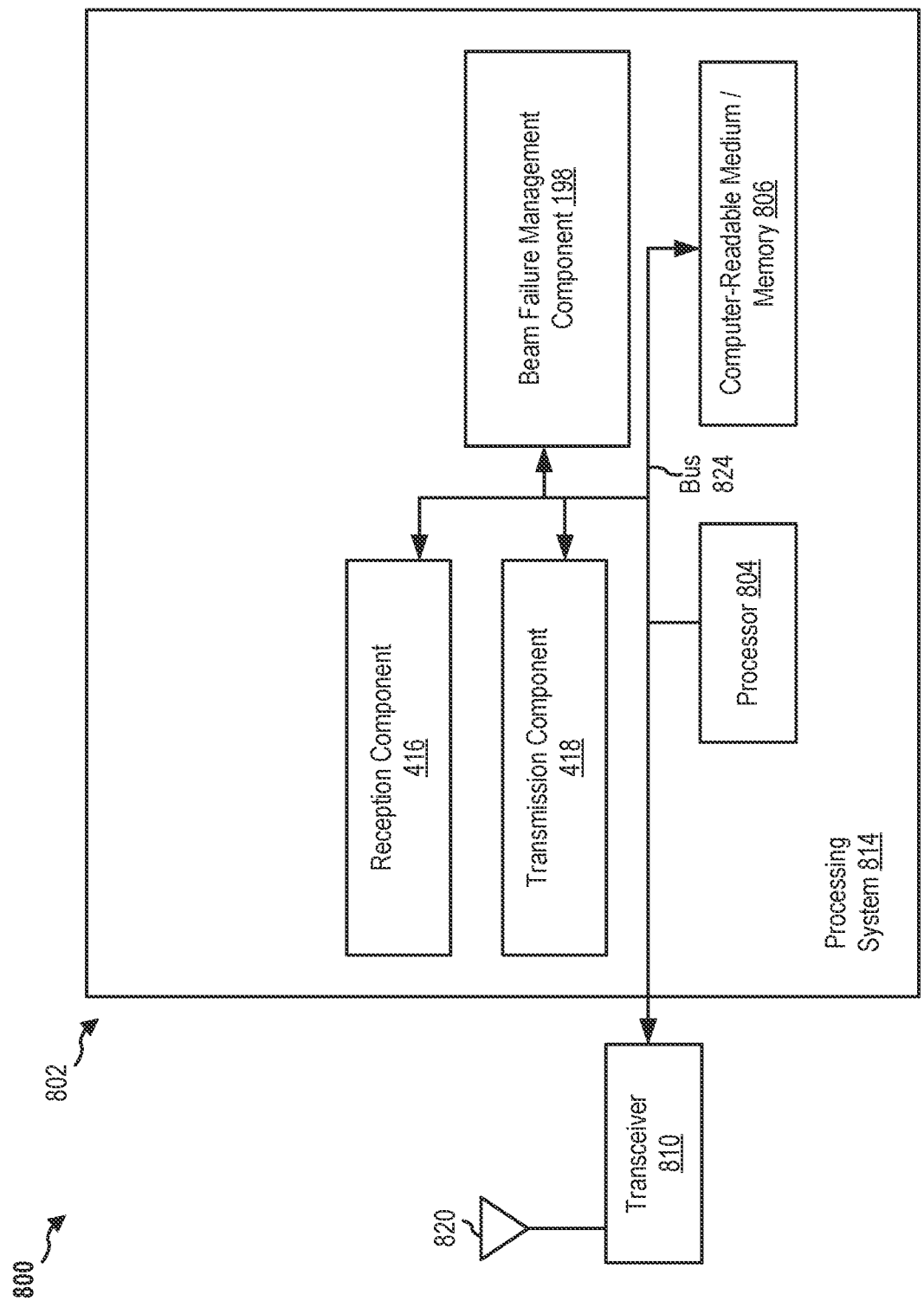
FIG. 8 is a diagram illustrating an example of a hardware implementation for a base station employing a processing system, in accordance with some aspects of the present disclosure.

FIG. 8 is a diagram 800 illustrating an example of a hardware implementation for a base station 802 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the beam failure management component 198, and the computer-readable medium/memory 806. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 is coupled with one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 416. The reception component 416 may receive the downlink and uplink transmissions 410 and the requests 424(1)-(n). In addition, the transceiver 810 receives information from the processing system 814, specifically the transmission component 418, and based on the received information, generates a signal to be applied to the one or more antennas 820. Further, the transmission component 418 may send the downlink and uplink transmissions 410, the BFD-RS 412, and/or the beam failure configuration information 414.

The processing system 814 includes a processor 804 coupled with a computer-readable medium/memory 806 (e.g., a non-transitory computer readable medium). The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes the beam failure management component 198. The aforementioned components may be software components running in the processor 804, resident/stored in the computer readable medium/memory 806, one or more hardware components coupled with the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3, 402 of FIG. 4).

The beam failure management component 198 may configured the beam failure detection process at a UE (e.g., the UE 404) via the beam failure configuration information 414. In particular, the beam failure management component 198 may determine the weight that should be given to specific types of BFI events and configure the UE accordingly via the configuration parameters of the beam failure configuration information 414. Further, beam failure management component 198 may receive requests 424 from a UE (e.g., the UE 404) that has declared beam failure, and perform a beam failure recovery process with the UE.

The aforementioned means may be one or more of the aforementioned components of the base station 802 and/or the processing system 814 of the base station 802 configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
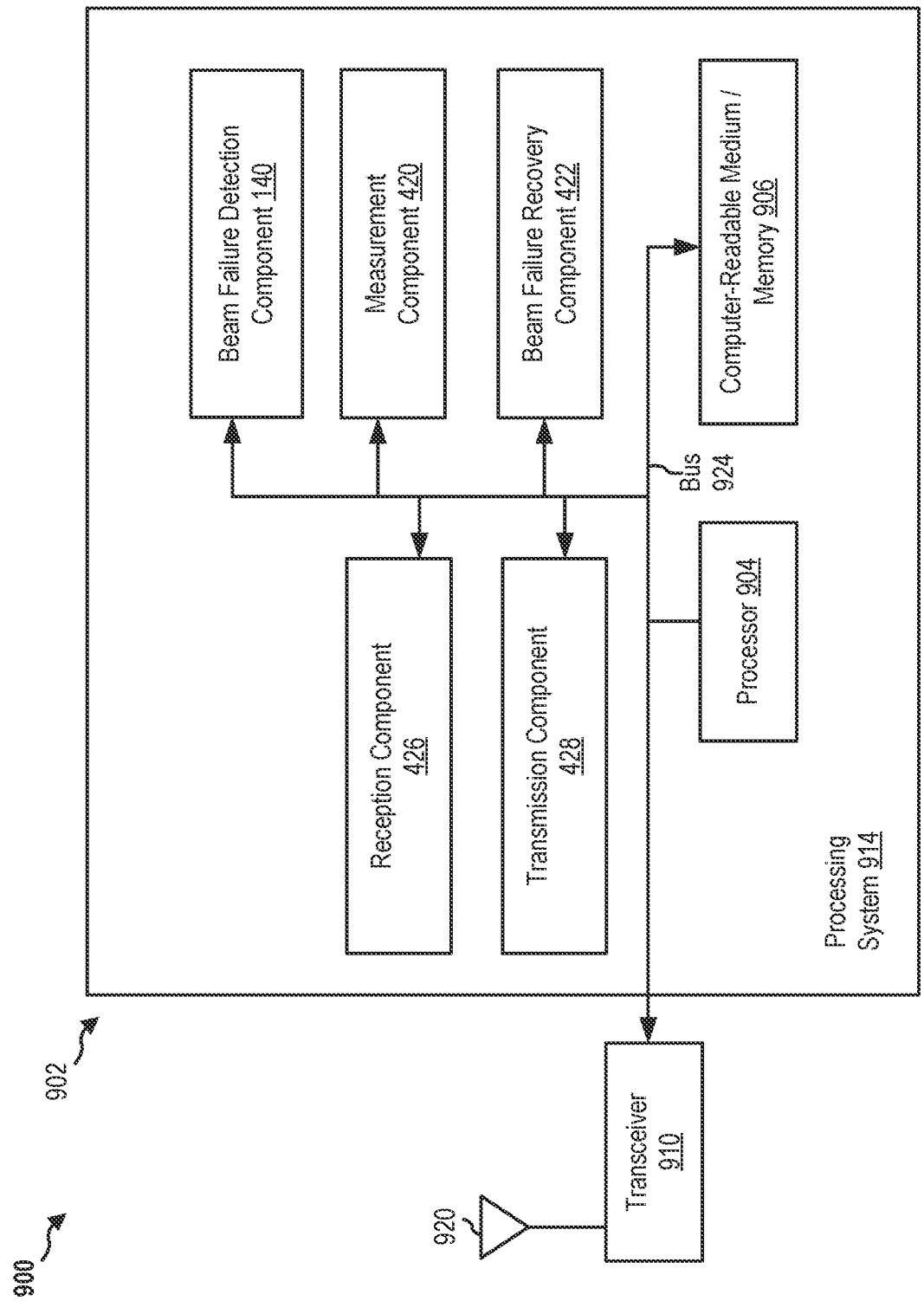
FIG. 9 is a diagram illustrating an example of a hardware implementation for a UE employing a processing system, in accordance with some aspects of the present disclosure.

FIG. 9 is a diagram 900 illustrating an example of a hardware implementation for a UE 902 (e.g., the UE 104, the UE 404, etc.) employing a processing system 914. The processing system 914 may be implemented with a bus architecture, represented generally by the bus 924. The bus 924 may include any number of interconnecting buses and/or bridges depending on the specific application of the processing system 914 and the overall design constraints. The bus 924 links together various circuits including one or more processors and/or hardware components, represented by the processor 904, the measurement component 420, the beam failure detection component 140, and the beam failure recovery component 422, and the computer-readable medium (e.g., non-transitory computer-readable medium)/memory 906. The bus 924 may also link various other circuits such as timing sources, peripherals, voltage regulators, and power management circuits, which are well known in the art, and therefore, will not be described any further.

The processing system 914 may be coupled with a transceiver 910. The transceiver 910 may be coupled with one or more antennas 920. The transceiver 910 provides a means for communicating with various other apparatus over a transmission medium. The transceiver 910 receives a signal from the one or more antennas, extracts information from the received signal, and provides the extracted information to the processing system 914, specifically the reception component 426. The reception component 426 may receive the downlink and uplink transmissions 410, the BFD-RS 412, and/or the beam failure configuration information 414. In addition, the transceiver 910 receives information from the processing system 914, specifically the transmission component 428, and based on the received information, generates a signal to be applied to the one or more antennas. Further, the transmission component 428 may transmit the downlink and uplink transmissions 410.

The processing system 914 includes a processor 904 coupled with a computer-readable medium/memory 906 (e.g., a non-transitory computer readable medium). The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the measurement component 420, the beam failure detection component 140, and the beam failure recovery component 422. The aforementioned components may be a software component running in the processor 904, resident/stored in the computer readable medium/memory 906, one or more hardware components coupled with the processor 904, or some combination thereof. The processing system 914 may be a component of the UE 390 and may include the memory 360 and/or at least one of the TX processor 368, the RX processor 356, and the controller/processor 359. Alternatively, the processing system 914 may be the entire UE (e.g., see 390 of FIG. 3, 404 of FIG. 4).

The measurement component 420 may configured to measure BFD-RSs 412(1)-(n) received from a base station (e.g., the base station 402). Further, the beam failure detection component 140 may be configured to generate BFIs based on the measurements, and maintain count information indicating the amount of BFIs generated by the UE. As described in detail herein, the beam failure detection component 140 may distinguish the weight given to different types of BFIs generated by the UE based on the beam failure configuration information 414(1)-(n) received from the base station. Further, when beam failure detection component 140 determines that the count information indicates that a total count of BFIs generated by the UE equals or exceeds a predefined value, the beam failure detection component 140 may declare beam failure. Further, in response to declaration of beam failure, the beam failure recovery component 422 may transmit a request 424 to the base station and perform a beam failure recovery process with the base station.

The aforementioned means may be one or more of the aforementioned components of the UE 902 and/or the processing system 914 of UE 902 configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 10 is a flowchart of a method 1000 of implementing enhanced beam failure detection. The method may be performed by a base station (e.g., the base station 102, which may include the memory 376 and which may be the entire base station or a component of the base station, such as beam failure management component 198, the TX processor 316, the RX processor 370, and/or the controller/processor 375; the base station 402, the base station 802).

At block 1010, the method 1000 may include transmitting, to a UE, beam failure configuration information indicating at least a detection function to be applied during a beam failure detection process that distinguishes between an occurrence of an interference event based on a first measurement of a BFD-RS by the UE or a channel event based on a second measurement of the BFD-RS by the UE. For example, the base station 402 may transmit RRC signaling including the beam failure configuration information 414, as described in detail herein.

Accordingly, the base station 102, the base station 402, the base station 802, the TX processor 316, the RX processor 370, and/or the controller/processor 375 executing the beam failure management component 198 may provide means for transmitting, to a UE, beam failure configuration information indicating at least a detection function to be applied during a beam failure detection process that distinguishes between an occurrence of an interference event based on a first measurement of a BFD-RS by the UE or a channel event based on a second measurement of the BFD-RS by the UE.

At block 1020, the method 1000 may optionally include transmitting, to the LIE, second beam failure configuration information indicating one or more configuration parameters of the beam failure detection process. For example, the base station 402 may transmit DCI or a MAC-CE including the beam failure configuration information 414.

Accordingly, the base station 102, the base station 402, the base station 802, the RX processor 370, and/or the controller/processor 375 executing the beam failure management component 198 may provide means for transmitting, to the UE, second beam failure configuration information indicating one or more configuration parameters of the beam failure detection process.

At block 1030, the method 1000 may include transmitting to the UE, the BFD-RS to be measured during the beam failure detection process performed at the UE. For example, the base station 402 may periodically transmit the BFD-RSs 412(1)-(N) to the UE 404.

Accordingly, the base station 102, the base station 402, the base station 802, the RX processor 370, and/or the controller/processor 375 executing the beam failure management component 198 may provide means for transmitting, to the UE, the BFD-RS to be measured during the beam failure detection process performed at the UE.

At block 1040, the method 1000 may include optionally include receiving a beam failure recovery request based on the BFD-RS and the UE performing the beam failure detection process in accordance with the beam failure configuration information. For example, the base station 402 may receive the request 424, from the UE 404, for beam failure recovery via a RACH procedure or a PUCCH.

Accordingly, the base station 102, the base station 402, the base station 802, the RX processor 370, and/or the controller/processor 375 executing the beam failure management component 198 may provide means for receiving a beam failure recovery request based on the BFD-RS and the UE performing the beam failure detection process in accordance with the beam failure configuration information.

Figure 11:
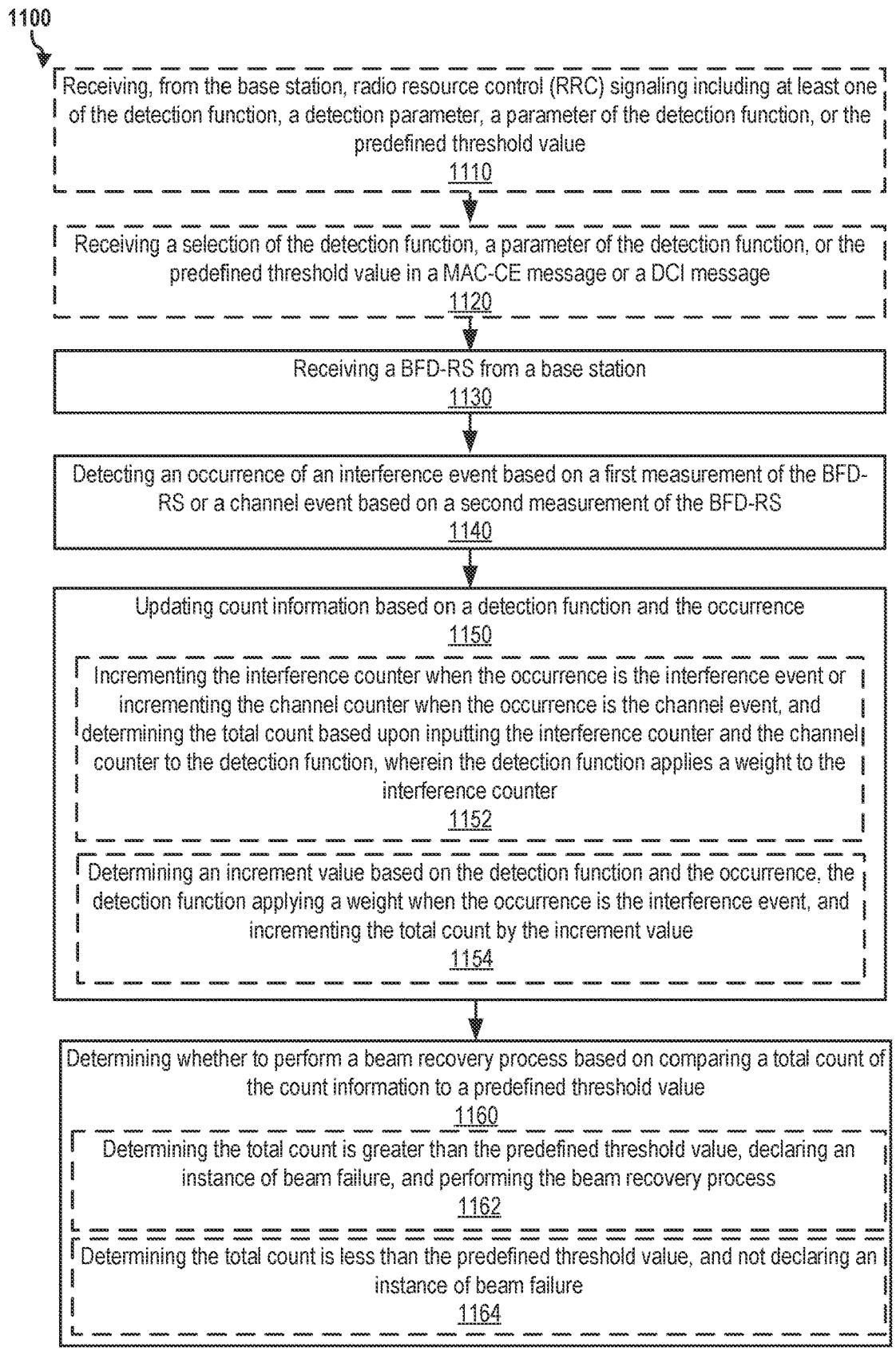
FIG. 11 is a flowchart of an example method of implementing beam failure detection enhancement at a UE, in accordance with some aspects of the present disclosure.

FIG. 11 is a flowchart of a method 1100 of implementing enhanced beam failure detection, in accordance with some aspects of the present disclosure. The method may be performed by a UE (e.g., the UE 104 of FIGS. 1 and 3, which may include the memory 360 and which may be the entire UE 104 or a component of the UE 104, such as beam failure detection component 140, the TX processor 368, the RX processor 356, and/or the controller/processor 359; the UE 404 of FIG. 4; and/or the UE 902 of FIG. 9).

At block 1110, the method 1100 may optionally include receiving, from the base station, RRC signaling including at least one of the detection function, a detection parameter, a parameter of the detection function, or the predefined threshold value. For example, the UE 404 may receive the beam failure configuration information 414 via an RRC. Accordingly, the UE 104, the UE 404, UE 902, the TX processor 368, the RX processor 356, and/or the controller/processor 359 executing the beam failure detection component 140 may provide means for receiving, from the base station, (RRC signaling including at least one of the detection function, a detection parameter, a parameter of the detection function, or the predefined threshold value.

At block 1120, the method 1100 may optionally include receiving a selection of the detection function, a parameter of the detection function, or the predefined threshold value in a MAC-CE message or a DCI message. For example, the UE 404 may receive the beam failure configuration information 414 via a MAC-CE message or a DCI message.

Accordingly, the UE 104, the UE 404, UE 902, the TX processor 368, the RX processor 356, and/or the controller/processor 359 executing the beam failure detection component 140 may provide means for receiving a selection of the detection function, a parameter of the detection function, or the predefined threshold value in a MAC-CE message or a DCI message.

At block 1130, the method 1100 includes receiving a BFD-RS from a base station. For example, the UE 404 may receive the BFD-RS 412 from the base station 402. Accordingly, the UE 104, the UE 404, UE 902, the TX processor 368, the RX processor 356, and/or the controller/processor 359 executing the beam failure detection component 140 may provide means for receiving a BFD-RS from a base station.

At block 1140, the method 1100 may include detecting an occurrence of an interference event based on a first measurement of the BFD-RS or a channel event based on a second measurement of the BFD-RS. For example, the measurement component 420 may measure the BFD-RS 412, and beam failure detection component 140 may determine to generate a BFI and the type of the BFI to generate.

Accordingly, the UE 104, the UE 404, UE 902, the TX processor 368, the RX processor 356, and/or the controller/processor 359 executing the beam failure detection component 140 may provide means for detecting an occurrence of an interference event based on a first measurement of the BFD-RS or a channel event based on a second measurement of the BFD-RS.

At block 1150, the method 1100 may include updating count information based on a detection function and the occurrence. For example, the beam failure detection component 140 may update one or more counters tracking the amount of BFIs generated during a period of time in which at least one of the pc_timer and the ie_timer are active.

At sub-block 1152, the block 1150 may optionally include incrementing the interference counter when the occurrence is the interference event or incrementing the channel counter when the occurrence is the channel event, and determining the total count based upon inputting the interference counter and the channel counter to the detection function, wherein the detection function applies a weight to the interference counter.

At sub-block 1154, the block 1150 may optionally include determining an increment value based on the detection function and the occurrence, the detection function applying a weight when the occurrence is the interference event, and incrementing the total count by the increment value.

Accordingly, the UE 104, the UE 404, UE 902, the TX processor 368, the RX processor 356, and/or the controller/processor 359 executing the beam failure detection component 140 may provide means for updating count information based on a detection function and the occurrence.

At block 1160, the method 1100 may include determining whether to perform a beam failure recovery process based on comparing a total count of the count information to a predefined threshold value. For example, the beam failure detection component 140 may determine whether to perform a beam recovery process based on comparing a total count to a predefined threshold value.

At sub-block 1162, the block 1160 may optionally include determining the total count is greater than the predefined threshold value, declaring an instance of beam failure, and performing the beam failure recovery process.

At sub-block 1164, the block 1160 may optionally include determining the total count is less than the predefined threshold value, and not declaring an instance of beam failure.

Accordingly, the UE 104, the UE 404, UE 902, the TX processor 368, the RX processor 356, and/or the controller/processor 359 executing the beam failure detection component 140 may provide means for determining whether to perform a beam failure recovery process based on comparing a total count of the count information to a predefined threshold value.

In an additional aspect, the method 1100 further comprises re-initializing the interference counter in response to the first timer expiring or re-initializing the channel counter in response to the second timer expiring. For example, the beam failure detection component 140 may set the ie_counter to zero in response to the associated counter expiring, and set the pc_counter to zero in response to the associated timer expiring. Accordingly, the UE 104, the UE 404, UE 902, the TX processor 368, the RX processor 356, and/or the controller/processor 359 executing the beam failure detection component 140 may provide means for re-initializing the interference counter in response to the first timer expiring or re-initializing the channel counter in response to the second timer expiring.

In an additional aspect, the method 1100 further comprises rounding the total count in response to the first timer expiring or re-initializing the total count in response to the second timer expiring. For example, the beam failure detection component 140 may round down the total count in response to the ie_timer expiring. Accordingly, the UE 104, the UE 404, UE 902, the TX processor 368, the RX processor 356, and/or the controller/processor 359 executing the beam failure detection component 140 may provide means for comprising rounding the total count in response to the first timer expiring or re-initializing the total count in response to the second timer expiring.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a user equipment (UE), the method comprising: receiving a beam failure detection reference signal (BFD-RS) from a base station; detecting an occurrence of an interference event based on a first measurement of the BFD-RS or a channel event based on a second measurement of the BFD-RS; updating count information based on a detection function and the occurrence; determining that at least one of a first timer for interference events or a second timer for channel events is active; and determining whether to perform a beam failure recovery process based on comparing a total count of the count information to a predefined threshold value.

B. The method as paragraph A recites, the method further comprising receiving, from the base station, radio resource control (RRC) signaling including at least one of the detection function, a detection parameter, a parameter of the detection function, the predefined threshold value, or an expiration value for the first timer or the second timer.

C. The method as any of paragraphs A-B recite, the method further comprising receiving a selection of the detection function, a parameter of the detection function, or the predefined threshold value in a medium access control-control element (MAC-CE) message or a downlink control information (DCI) message.

D. The method as any of paragraphs A-C recite, the method further comprising receiving a selection of the detection function, a parameter of the detection function, or the predefined threshold value in a medium access control-control element (MAC-CE) message or a downlink control information (DCI) message.

E. The method as any of paragraphs A-D recite, the method further comprising receiving a selection of an expiration value for the first timer or the second timer in a medium access control-control element (MAC-CE) message or a downlink control information (DCI) message.

F. The method as any of paragraphs A-E recite, the method further comprising initiating the first timer when the occurrence is the interference event or initiating the second timer when the occurrence is the channel event.

G. The method as paragraph F recites, wherein the count information includes an interference counter configured to track occurrences of the interference events and a channel counter configured to track occurrences of channel events, and updating the count information based on the detection function and the occurrence comprises: incrementing the interference counter when the occurrence is the interference event or incrementing the channel counter when the occurrence is the channel event; and determining the total count based upon inputting the interference counter and the channel counter to the detection function, wherein the detection function applies a weight to the interference counter.

H. The method as any of paragraphs A-G recite, the method further comprising re-initializing the interference counter in response to the first timer expiring or re-initializing the channel counter in response to the second timer expiring.

I. The method as any of paragraphs A-E recite, wherein updating the count information based on the detection function and the occurrence comprises: determining an increment value based on the detection function and the occurrence, the detection function applying a weight when the occurrence is the interference event; and incrementing the total count by the increment value.

J. The method as paragraph I recites, the method further comprising rounding the total count in response to the first timer expiring or re-initializing the total count in response to the second timer expiring.

K. The method as any of paragraphs A-J recite, the method further comprising determining whether to perform the beam failure recovery process comprising: determining the total count is greater than the predefined threshold value; and performing the beam failure recovery process.

L. A user equipment for wireless communication, comprising a memory storing computer-executable instructions; and at least one processor coupled with the memory and configured to execute the computer-executable instructions to perform the method of any of claims A-K.

M. A user equipment for wireless communication, comprising means for performing the method of any of claims A-K.

N. A non-transitory computer-readable medium storing computer executable code, the code when executed by a processor causes the processor to perform the method of any of claims A-K.

O. A method of wireless communication at base station, the method comprising: transmitting, to a user equipment (UE), beam failure configuration information indicating at least a detection function to be applied during a beam failure detection process that distinguishes between an occurrence of an interference event based on a first measurement of a beam failure detection reference signal (BFD-RS) by the UE or a channel event based on a second measurement of the BFD-RS by the UE; and transmitting, to the UE, the BFD-RS to be measured during the beam failure detection process performed at the UE.

P. The method as paragraph O recites, the method further comprising: receiving a beam failure recovery request based on the BFD-RS and the UE performing the beam failure detection process in accordance with the beam failure configuration information.

Q. The method as any of paragraphs O-P recites, wherein transmitting the beam failure configuration information comprises transmitting a Radio Resource Control (RRC) signaling identifying the detection function.

R. The method as any of paragraphs O-Q recites, wherein the beam failure configuration information is first beam failure configuration information, and further comprising transmitting, to the UE, second beam failure configuration information indicating one or more configuration parameters of the beam failure detection process.

S. The method as paragraph R recites, wherein transmitting the second beam failure configuration information, comprises transmitting DL control information (DCI) including the one or more configuration parameters.

T. The method as paragraph R recites, wherein transmitting the second beam failure configuration information, comprises transmitting a medium access control (MAC) control element (CE) including the one or more configuration parameters.

U. A base station for wireless communication, comprising a memory storing computer-executable instructions; and at least one processor coupled with the memory and configured to execute the computer-executable instructions to perform the method of any of claims O-T.

V. A base station for wireless communication, comprising means for performing the method of any of claims O-T.

W. A non-transitory computer-readable medium storing computer executable code, the code when executed by a processor causes the processor to perform the method of any of claims O-T.

What is claimed is:

1. A method of wireless communication at a user equipment (UE), the method comprising:
   receiving a beam failure detection reference signal (BFD-RS) from a base station;
   detecting an occurrence of an interference event based on a first measurement of the BFD-RS or a channel event based on a second measurement of the BFD-RS;
   updating count information based on a detection function and the occurrence;
   determining that at least one of a first timer for interference events or a second timer for channel events is active; and determining whether to perform a beam failure recovery process based on comparing a total count of the count information to a predefined threshold value.

2. The method of claim 1, further comprising receiving, from the base station, radio resource control (RRC) signaling including at least one of the detection function, a detection parameter, a parameter of the detection function, the predefined threshold value, or an expiration value for the first timer or the second timer.

3. The method of claim 1, further comprising receiving a selection of the detection function, a parameter of the detection function, or the predefined threshold value in a medium access control-control element (MAC-CE) message or a downlink control information (DCI) message.

4. The method of claim 1, further comprising receiving a selection of an expiration value for the first timer or the second timer in a medium access control-control element (MAC-CE) message or a downlink control information (DCI) message.

5. The method of claim 1, further comprising initiating the first timer when the occurrence is the interference event or initiating the second timer when the occurrence is the channel event.

6. The method of claim 1, wherein the count information includes an interference counter configured to track occurrences of the interference events and a channel counter configured to track occurrences of channel events, and updating the count information based on the detection function and the occurrence comprises:
incrementing the interference counter when the occurrence is the interference event or incrementing the channel counter when the occurrence is the channel event; and
determining the total count based upon inputting the interference counter and the channel counter to the detection function, wherein the detection function applies a weight to the interference counter.

7. The method of claim 6, further comprising re-initializing the interference counter in response to the first timer expiring or re-initializing the channel counter in response to the second timer expiring.

8. The method of claim 1, wherein updating the count information based on the detection function and the occurrence comprises:
determining an increment value based on the detection function and the occurrence, the detection function applying a weight when the occurrence is the interference event; and
incrementing the total count by the increment value.

9. The method of claim 8, further comprising rounding the total count in response to the first timer expiring or re-initializing the total count in response to the second timer expiring.

10. The method of claim 1, further comprising determining whether to perform the beam failure recovery process comprising:
determining the total count is greater than the predefined threshold value; and
performing the beam failure recovery process.

11. A user equipment (UE) for wireless communication, comprising:
a memory storing computer-executable instructions; and
at least one processor coupled with the memory and configured to execute the computer-executable instructions to:
receive a beam failure detection reference signal (BFD-RS) from a base station;
detect an occurrence of an interference event based on a first measurement of the BFD-RS or a channel event based on a second measurement of the BFD-RS;
update count information based on a detection function and the occurrence;
determine that at least one of a first timer for interference events or a second timer for channel events is active; and
determine whether to perform a beam failure recovery process based on comparing a total count of the count information to a predefined threshold value.

12. The UE of claim 11, wherein the at least one processor is further configured to execute the computer-executable instructions to receive, from the base station, radio resource control (RRC) signaling including at least one of the detection function, a detection parameter, a parameter of the detection function, the predefined threshold value, or an expiration value for the first timer or the second timer.

13. The UE of claim 11, wherein the at least one processor is further configured to execute the computer-executable instructions to receive a selection of the detection function, a parameter of the detection function, or the predefined threshold value in a medium access control-control element (MAC-CE) message or a downlink control information (DCI) message.

14. The UE of claim 11, wherein the at least one processor is further configured to execute the computer-executable instructions to receive a selection of an expiration value for the first timer or the second timer in a medium access control-control element (MAC-CE) message or a downlink control information (DCI) message.

15. The UE of claim 11, wherein the at least one processor is further configured to execute the computer-executable instructions to initiate the first timer when the occurrence is the interference event or initiate the second timer when the occurrence is the channel event.

16. The UE of claim 11, wherein the count information includes an interference counter configured to track occurrences of the interference events and a channel counter configured to track occurrences of the channel events, and to update the count information, the at least one processor is further configured to execute the computer-executable instructions to:
increment the interference counter when the occurrence is the interference event or incrementing the channel counter when the occurrence is the channel event; and
determine the total count based upon inputting the interference counter and the channel counter to the detection function, wherein the detection function applies a weight to the interference counter.

17. The UE of claim 16, wherein the at least one processor is further configured to execute the computer-executable instructions to re-initialize the interference counter in response to the first timer expiring or re-initialize the channel counter in response to the second timer expiring.

18. The UE of claim 11, wherein to update the count information, the at least one processor is further configured to execute the computer-executable instructions to:
determine an increment value based on the detection function and the occurrence, the detection function applying a weight when the occurrence is the interference event; and
increment the total count by the increment value.

19. The UE of claim 18, wherein the at least one processor is further configured to execute the computer-executable instructions to round the total count in response to the first timer expiring or re-initializing the total count in response to the second timer expiring.

20. The UE of claim 11, wherein to determine whether to perform the beam failure recovery process, the at least one processor is further configured to execute the computer-executable instructions to:
    determine the total count is greater than the predefined threshold value; and
    perform the beam failure recovery process.

21. A method of wireless communication at a base station, the method comprising:
    transmitting, to a user equipment (UE), beam failure configuration information indicating at least a detection function to be applied during a beam failure detection process that distinguishes between an occurrence of an interference event based on a first measurement of a beam failure detection reference signal (BFD-RS) by the UE or a channel event based on a second measurement of the BFD-RS by the UE; and
    transmitting, to the UE, the BFD-RS to be measured during the beam failure detection process performed at the UE.

22. The method of claim 21, further comprising:
    receiving a beam failure recovery request based on the BFD-RS and the UE performing the beam failure detection process in accordance with the beam failure configuration information.

23. The method of claim 21, wherein transmitting the beam failure configuration information comprises:
    transmitting a Radio Resource Control (RRC) signaling identifying the detection function.

24. The method of claim 21, wherein the beam failure configuration information is first beam failure configuration information, and further comprising:
    transmitting, to the UE, second beam failure configuration information indicating one or more configuration parameters of the beam failure detection process.

25. The method of claim 24, wherein transmitting the second beam failure configuration information, comprises:
    transmitting DL control information (DCI) including the one or more configuration parameters.

26. The method of claim 24, wherein transmitting the second beam failure configuration information, comprises:
    transmitting a medium access control (MAC) control element (CE) including the one or more configuration parameters.

27. A base station for wireless communication, comprising:
    a memory storing computer-executable instructions; and
    at least one processor coupled with the memory and configured to execute the computer-executable instructions to:
        transmit, to a user equipment (UE), beam failure configuration information indicating at least a detection function to be applied during a beam failure detection process that distinguishes between an occurrence of an interference event based on a first measurement of a beam failure detection reference signal (BFD-RS) by the UE or a channel event based on a second measurement of the BFD-RS by the UE; and
        transmit, to the UE, the BFD-RS to be measured during the beam failure detection process performed at the UE.

28. The base station of claim 27, wherein the at least one processor is further configured to:
    receive a beam failure recovery request based on the BFD-RS and the UE performing the beam failure detection process in accordance with the beam failure configuration information.

29. The base station of claim 27, wherein to transmit the beam failure configuration information, the at least one processor is configured to:
    transmit a Radio Resource Control (RRC) signaling identifying the detection function.

30. The base station of claim 27, wherein the beam failure configuration information is first beam failure configuration information, and the at least one processor is further configured to:
    transmit, to the UE, second beam failure configuration information indicating one or more configuration parameters of the beam failure detection process.

* * * * *